United States Patent [19]

Rattunde

[11] Patent Number: 4,504,255
[45] Date of Patent: Mar. 12, 1985

[54] SIDE-BAR DRIVE CHAIN
[75] Inventor: Manfred Rattunde, Bad Homburg, Fed. Rep. of Germany
[73] Assignee: Reimers Getriebe AG, Zug, Switzerland
[21] Appl. No.: 452,041
[22] Filed: Dec. 22, 1982
[30] Foreign Application Priority Data
Dec. 29, 1981 [DE] Fed. Rep. of Germany ....... 3151728
[51] Int. Cl.³ .............................................. F16G 1/00
[52] U.S. Cl. .................................. 474/201; 474/242; 474/244; 474/214
[58] Field of Search ............... 474/201, 242, 244, 245, 474/214

[56] References Cited
FOREIGN PATENT DOCUMENTS 1119065 12/1961 Fed. Rep. of Germany .
1302795 11/1970 Fed. Rep. of Germany .
2356289 6/1975 Fed. Rep. of Germany .
196332 4/1923 United Kingdom ................ 474/245

Primary Examiner—James A. Leppink
Assistant Examiner—Frank H. McKenzie, Jr.
Attorney, Agent, or Firm—Spencer & Frank

[57] ABSTRACT

A side-bar chain has chain links each formed of a stack of side bars and chain pins traversing aligned side bar openings in the side bars of each stack transversely to the chain length; and a plurality of chain braces each formed by opposite outermost side bars of at least some of the chain links and a transverse web joining the brace-forming side bars to one another and straddling the side bar stack transversely to the chain length. Each brace-forming side bar includes a longitudinal web extending parallel to the chain length between the side bar opening and the transverse web. The transverse web of each chain brace has an aperture for reducing a cross-sectional dimension of the transverse web measured parallel to the chain length at least adjacent the longitudinal web of each brace-forming side bar. The transverse web has an outer width dimension which is measured parallel to the chain length and which is substantially equal to a length dimension of the brace-forming side bars, measured parallel to the chain length.

11 Claims, 10 Drawing Figures

SIDE-BAR DRIVE CHAIN

BACKGROUND OF THE INVENTION

This invention relates to a side-bar chain for chain drives, particularly for infinitely variable cone pulley transmissions. The articulations (chain pins) coupling the individual chain links together are constituted by pressure members accommodated in aligned apertures of the side bars forming the links. The opposite end faces of the pressure members transmit the frictional forces between pulley and chain. Further, the outermost (flanking) side bars of at least some of the chain links are combined into a brace by means of a transverse web straddling the individual side bars which are situated between the flanking side bars.

Side-bar chains of the above-outlined type are known in numerous constructions, such as disclosed in German Pat. Nos. 1,065,685, 1,119,065, 1,302,795 and 2,356,289. The side-bar chains may be of the dual side-bar coupling as disclosed, for example, in German Pat. No. 1,065,685 or of the triple side-bar coupling as shown, for example, in FIG. 14 of German Pat. No. 1,119,065. In case of a dual side-bar coupling, the pressure members are at a relatively large distance from one another as viewed in the direction of chain run (chain length) and may be formed, for example, as pairs of rocker pieces. The structure is relatively narrow in a direction transverse to the chain length. In contradistinction, in case of triple side-bar coupling, the chain dimension measured transversely to the chain length is relatively wide, while the distance of the pairs of rocker pieces from one another is relatively small which permits a reduction of the chain pitch (chain division). Further examples of such side-bar chains are described in U.S. patent application Ser. No. 285,869, filed July 22, 1981, naming Manfred Rattunde and Walter Schapf as inventors and assigned to the assignee of the present application.

In the side-bar chains outlined above, the brace formed in each instance by two side bars and the interconnecting transverse web serves to increase the anti-torsion stiffness of the chain and to so position the individual side bars straddled by the brace that solely the pulley discs and the articulations (chain pins) participate in the force transmission between the pulleys and the chain. By virtue of the wear in the articulations, side-bar chains without braces lose rapidly their initial stiffness which resists shearing and torsion forces. This results in an increased wear in the articulations. This occurrence, in turn, causes a further reduction in the anti-shearing and anti-torsion stiffness of the chain.

The known chain braces, however, as compared to the individual side bars have a different behavior of deformation in the tension force transmitting zone, where the side bars forming the brace are joined to the transverse web. This is so, because at those locations the components have an increased stiffness. As a result, for a given identical force-application, in those locations only a small deformation can take place, whereby between the individual side bars and the side bars forming the brace a non-uniform force transmission and thus a non-uniform utilization of the material occurs. Particularly in case of excessive loads, the side bars forming the braces may thus be damaged or destroyed due to excessive tensions.

It is a further disadvantage of side bars forming an integral part of known chain braces that the pressure members, such as rocker pieces, are, in the zone of the side bars forming the brace, that is, at their ends, pressed towards one another by the brace-forming side bars with a greater force than in the remaining zones where they have a theoretically uniform linear engagement with the side bars which they traverse. This increases the load on the rocker pieces precisely at locations where they are stressed the most due to the frictional force transmission. This results at those locations in significant wear traces or crumbling and therefore a power transmission which would be otherwise warranted by the type of chain material, cannot be fully utilized in practice.

SUMMARY OF THE INVENTION

It is an object of the invention to provide an improved side-bar chain of the above-outlined type, particularly as concerns the structure of the chain braces so that the side bars which form an integral part of the braces, have the same properties as regards load-caused deformations as the other, individual side bars. It is a further object of the invention to achieve such a result by inexpensive and simple modifications of known chain braces.

These objects and others to become apparent as the specification progresses, are accomplished by the invention, according to which, briefly stated, the transverse web of each chain brace has an aperture for reducing a cross-sectional dimension of the transverse web measured parallel to the chain length at least adjacent the brace-forming side bars. The transverse web has an outer width dimension which is measured parallel to the chain length and which is substantially equal to a length dimension of the brace-forming side bars, measured parallel to the chain length.

By means of the above-outlined measures, the side bars forming an integral part of the chain braces have the same properties of deformation as the other, individual side bars, so that their effect (stresses) on the rocker pieces (articulations) passing therethrough will be the same as that of the other, individual side bars. Yet, the transverse web is capable, as before, of performing its function as regards the joining of the side bar stacks constituting the chain links as well as maintaining an anti-shear and anti-torsion stiffness of the chain.

It is a further particular advantage of the invention that by means of the aperture or apertures formed in the transverse brace web the weight of the chain and thus stresses therein derived from centrifugal forces are reduced so that, compared with known chains of comparable structure they have a greater power transmitting capability.

According to a further advantageous feature of the invention, the transverse brace web has, adjacent the brace-forming side bars, constricting recesses which are parallel to the running direction of the chain (that is, parallel to the chain length) and which extend from opposite outer edges of the brace to the mid-zone thereof. Thus, in such an arrangement, the transverse web is coupled with the side bars only by a narrow connecting portion which has no effect on the longitudinal deformation of the side bars forming the brace. As a further modification, the central region of the transverse web may be removed to thus provide an aperture, whereby additional material and weight can be saved. In such a case, for ensuring the necessary anti-shear and anti-torsion stiffness of the chain brace, it is expedient to provide the central bending line (that is, the center line of the angular bend where the side bars adjoin the transverse web) in the transverse web in the zone adjacent the constricting recesses or between the constricting recesses and the aperture.

According to another feature of the invention, the transverse web is provided with a window-like aperture adjacent each side bar integral therewith. In the alternative, the transverse web has a window-like aperture which is uninterrupted between the two side bars connected with the transverse web.

In the chain brace structured according to the last-named two embodiments it may be advantageous to provide that the cross section of the opening in the direction of the chain length is greater adjacent the side bars connected with the transverse web than the other cross-sectional zones of the opening. In such a case, the remaining web parts straddling the side bar stack may be of relatively rigid structure without the presence of such degree of rigidity in the immediate vicinity of the side bars forming part of the braces. In this connection it is of advantage that the central bending lines are provided in the transverse web at a distance next to the aperture edges adjoining the side bars.

DESCRIPTION OF THE PREFERRED EMBODIMENTS

Figure 1:
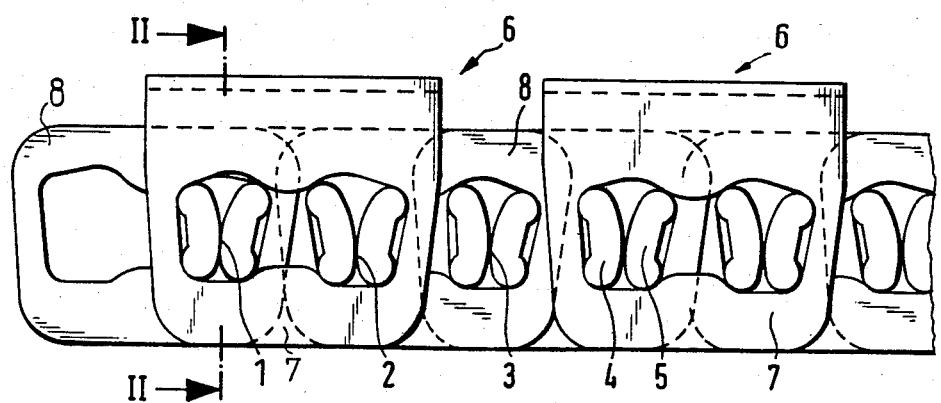
FIG. 1 is a side elevational view of a side-bar chain according to the prior art.
Figure 2:
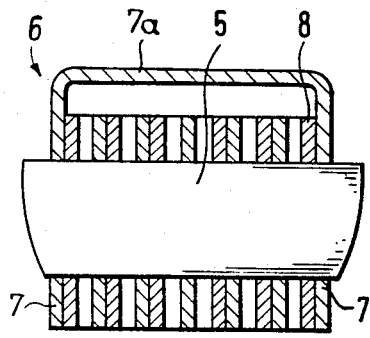
FIG. 2 is a sectional view taken along line II—II of FIG. 1.

FIGS. 1 and 2 show a conventional side-bar chain which is of the "triple side-bar coupling", because the construction is repetitive after every three articulations 1, 2 and 3. Each chain articulation is formed of two rocker pieces 4 and 5. The side-bar chain has side bars 8 as well as chain braces 6 which are spaced from one another in the direction of the chain length. Each chain brace 6 is constituted by two brace-forming outermost side bars 7 and an interconnecting transverse web 7a. The geometric relationships of the chain braces 6, including the opposite integral side bars 7 and web 7a with regard to the individual side bars 8 may be observed in FIGS. 1 and 2.

Figure 4:
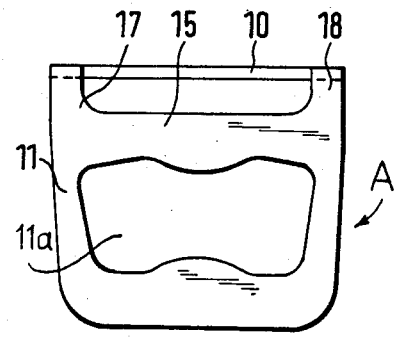
FIG. 4 is a side elevational view of the chain brace formed from the blank shown in FIG. 3.
Figure 3:
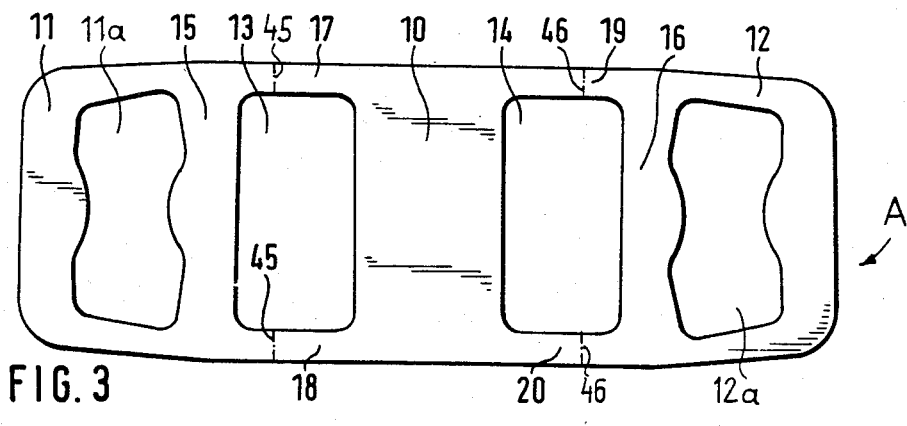
FIG. 3 is a top plan view of a planar blank of a chain brace according to a preferred embodiment of the invention.
Figure 5:
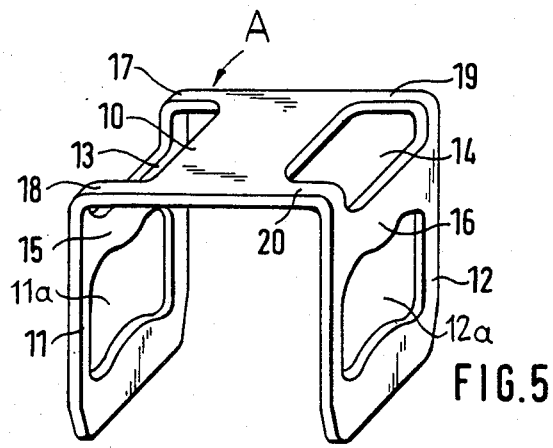
FIG. 5 is a perspective view of the chain brace shown in FIG. 4.

A first preferred embodiment of the chain brace according to the invention is shown in FIGS. 3, 4 and 5. The brace A comprises a transverse web 10 and side bars 11 and 12 extending from opposite edges of the transverse web 10. The transverse web 10 has, adjacent each side bar 11 and 12 window-like apertures 13 and 14, respectively, whose dimension measured in the direction of chain length practically corresponds to the like dimensions of the apertures 11a and 12a of the respective side bars 11 and 12. The apertures 13 and 14 are separated from the respective side-bar apertures 11a and 12a by means of respective longitudinal webs 15 and 16 whose cross section is identical to that of the individual side bars 8. The web portions 17, 18 and 19, 20 situated adjacent the apertures 13 and 14 and extending in the direction of the chain length are so dimensioned that the chain brace is capable of performing the required functions. Within the area of the web parts 17, 18 and 19, 20, bending lines 45 and 46 are provided.

Figure 6:
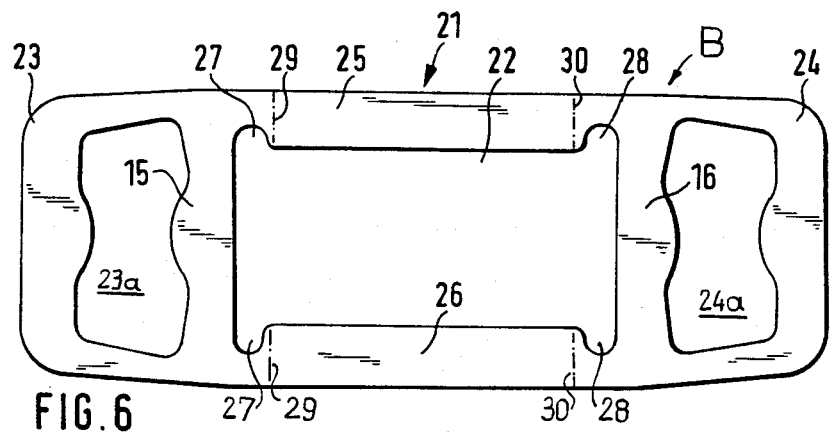
FIG. 6 is a top plan view of a planar blank of a chain brace according to another preferred embodiment of the invention.
Figure 7:
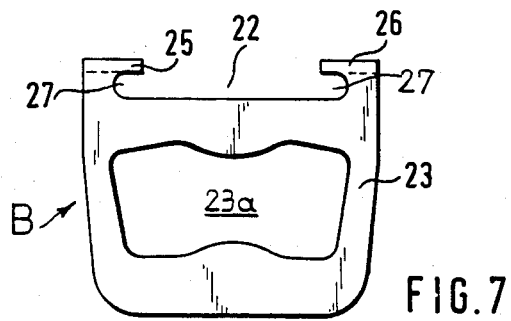
FIG. 7 is a side elevational view of the chain brace formed from the blank shown in FIG. 6.
Figure 8:
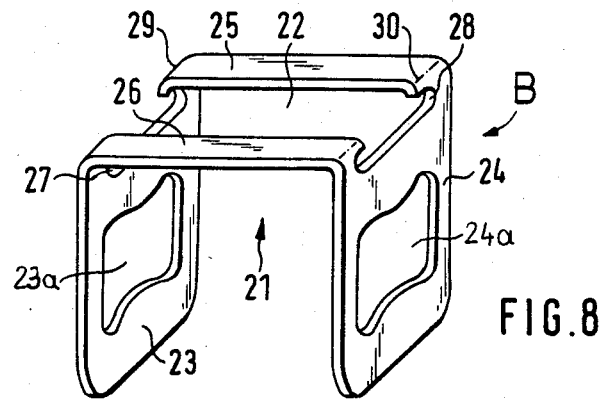
FIG. 8 is a perspective view of the chain brace shown in FIG. 7.

FIGS. 6, 7 and 8 illustrate another preferred embodiment of the invention. The chain brace B has a transverse web 21 provided with a sole aperture 22 which, similarly to the embodiment according to FIGS. 3, 4 and 5, begins adjacent the respective openings 23a and 24a of the integral side bars 23 and 24 with the interposition of longitudinal webs 15 and 16. The web aperture 22 bounds transverse web parts 25 and 26 of the transverse web 21. The aperture 22 provided in the web 21 has, adjacent the integral side bars 23 and 24, an area enlargement 27 and 28 for increasing the longitudinal deformability of the side bars 23 and 24 during greater-than-normal cross-sectional loads on the web parts 25 and 26 to ensure that the chain brace fulfills its purpose. As concerns the area enlargements 27 and 28, their course perpendicularly to the drawing FIG. 6 is so designed that the bend lines 29 and 30 extend in the wider, rather than narrower portions of the web parts 25 and 26.

Figure 9:
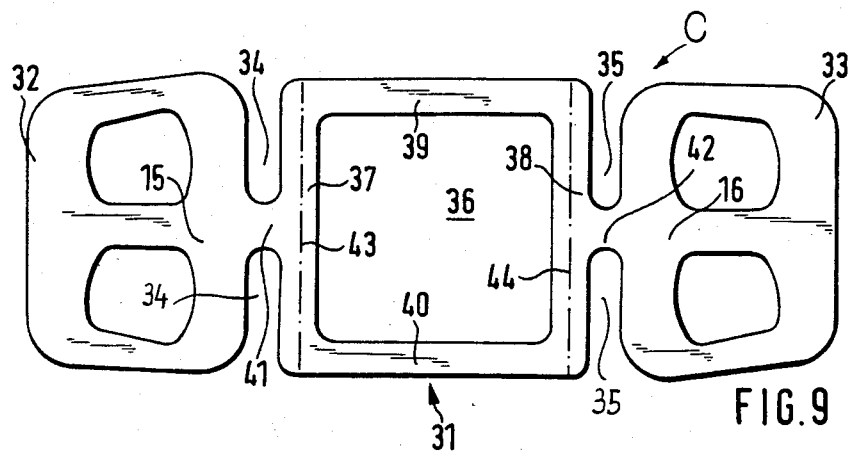
FIG. 9 is a top plan view of a planar blank of a chain brace according to still another preferred embodiment of the invention.
Figure 10:
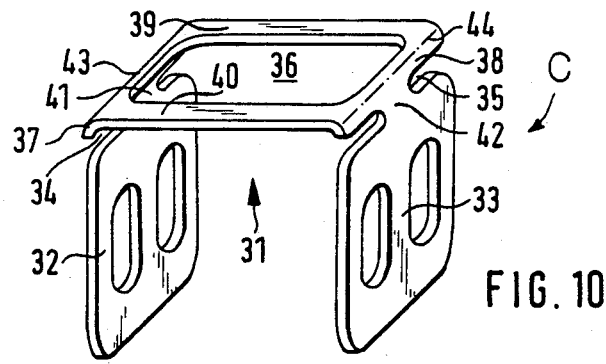
FIG. 10 is a perspective view of the chain brace formed from the blank shown in FIG. 9.

Turning now to FIGS. 9 and 10, there is shown a further preferred embodiment of the invention. A chain brace C has a transverse web 31 wherein the part that connects the web 31 with the longitudinal webs 15 and 16 of the side bars 32 and 33 has elongated constricting recesses 34 and 35 which extend in the direction of the chain length. The recesses extend from the brace edge bilaterally to the vicinity of the longitudinal middle thereof. Further, the transverse web 31 has a central aperture 36 which is so designed that the remaining web parts 37, 38, 39 and 40 are still capable of performing the required functions of the chain brace. This also applies to the constricted web parts 41 and 42 which connect the side bars 32 and 33 with the transverse web 31. For purposes of stability, the bend lines 43 and 44 extend between the transverse web 31 and the side bars 32 and 33 within the web parts 37 and 38, respectively.

It is a common characteristic of the three preferred embodiments described above that the axial deformability of the side bars which form an integral part of the brace is adapted to the other, individual side bars of the chain without adversely affecting the transverse webs in the performance of their required function. In addition, the apertures provided in the transverse webs result in a significant material and weight economy for the chain which renders them less expensive and improves their efficiency. The structure of the articulations and individual side bars, as well as their relationship to the chain braces structured according to the invention essentially correspond to those illustrated in FIGS. 1 and 2 and, accordingly, their description is not repeated in connection with the three disclosed preferred embodiments.

It is to be understood that the invention is not limited to the triple side-bar coupling having dual rocker pieces but may find application in side-bar chains with double side-bar coupling having single pressure members (pins) constituting each articulation.

It will be understood that above description of the present invention is susceptible to various changes, modifications and adaptations, and the same are intended to be comprehended within the meaning and range of equivalents of the appended claims.

What is claimed is:

1. In a side-bar chain having a chain length, chain links each formed of a stack of individual side bars and chain pins traversing aligned side bar openings in the side bars of each stack transversely to the chain length; and a plurality of chain braces each formed by opposite outermost, brace-forming side bars of at least some of the chain links and a transverse web joining said brace-forming side bars to one another and straddling the side bar stack transversely to the chain length; each said brace-forming side bar including a longitudinal web extending parallel to the chain length between said side bar opening and said transverse web; said transverse web having an outer width dimension measured parallel to said chain length; said width dimension being substantially equal to a length dimension of said brace-forming side bars, measured parallel to said chain length; the improvement comprising means defining an aperture in said transverse web of each said chain brace for reducing to such an extent a cross-sectional dimension of said transverse web measured parallel to the chain length at least adjacent the longitudinal web of each said brace-forming side bar that said brace-forming side bars have deformation characteristics substantially equal to the individual side bars.

2. A side-bar chain as defined in claim 1, further wherein said transverse web has constricting recesses adjacent the respective brace-forming side bars; further wherein said constricting recesses are oriented parallel to the chain length and extend from opposite edges of the chain brace to the vicinity of a middle thereof.

3. A side-bar chain as defined in claim 2, wherein said aperture in said transverse web occupies a central zone thereof.

4. A side-bar chain as defined in claim 3, wherein the brace-forming side bars are joined to the transverse web by a bend having a central bending line oriented parallel to the chain length; each central bending line being situated in said transverse web between said constricting recesses and said aperture.

5. A side-bar chain as defined in claim 1, wherein there are provided separate apertures in said transverse web adjacent each said brace-forming side bar.

6. A side-bar chain as defined in claim 5, wherein the brace-forming side bars are joined to the transverse web at an angular bend having a central bending line oriented parallel to the chain length; each said separate aperture having an edge adjacent each said brace-forming side bar; each said central bending line being situated in said transverse web at a distance from a respective said edge.

7. A side-bar chain as defined in claim 5, wherein a dimension of said separate apertures measured parallel to the chain length is greater adjacent the brace-forming side bars than in those zones of said apertures which are remote from the brace-forming side bars.

8. A side-bar chain as defined in claim 1, wherein said aperture is a sole aperture situated between and adjoining the brace-forming side bars.

9. A side-bar chain as defined in claim 8, wherein a dimension of said sole aperture measured parallel to the chain length is greater adjacent the brace-forming side bars than in those zones of said sole aperture which are remote from the brace-forming side bars.

10. A side-bar chain as defined in claim 8, wherein the brace-forming side bars are joined to the transverse web by a bend having a central bending line oriented parallel to the chain length; said sole aperture having an edge adjacent each said brace-forming side bar; each said central bending line being situated in said transverse web at a distance from a respective said edge.

11. A side-bar chain as defined in claim 1, wherein said aperture and said side bar openings have substantially identical dimensions measured parallel to the chain length.

* * * * *